United States Patent [19]

Tarsitano

[11] 3,841,335

[45] Oct. 15, 1974

[54] PNEUMATIC RECIPROCATING SURGICAL SAW AND FILE

[76] Inventor: John J. Tarsitano, USAF Hospital, Box 305, APO New York, N.Y. 09220

[22] Filed: Jan. 31, 1973

[21] Appl. No.: 328,156

[52] U.S. Cl................................. 128/317, 91/234
[51] Int. Cl............................................. A61b 17/14
[58] Field of Search ............... 91/232, 234; 128/317

[56] References Cited
UNITED STATES PATENTS

| | | | |
|---|---|---|---|
| 532,311 | 1/1895 | Carlinet | 9/234 X |
| 870,178 | 11/1907 | Johnson | 91/234 X |
| 885,985 | 4/1908 | Dunlap | 91/234 X |
| 1,428,630 | 9/1922 | Hammond | 91/234 |
| 3,183,786 | 5/1965 | Defoe, Jr. | 91/232 |
| 3,640,280 | 2/1972 | Slanker | 128/317 |
| 3,642,002 | 2/1972 | Otterstrom | 128/317 |

*Primary Examiner*—Channing L. Pace
*Attorney, Agent, or Firm*—Harry A. Herbert, Jr.; Arthur R. Parker

[57] ABSTRACT

A hand-held, pneumatically-operated, and reciprocating surgical saw and file having an elongated rod mounted for reciprocation with a saw or file attached to its front end, a compressed air-actuated piston fixed to, and moving the rod and attached saw or file in one direction during an air inlet stroke, and a coil return spring compressed by the air inlet stroke and thereby operative to automatically move the piston and saw or file-attached rod in the opposite direction.

4 Claims, 9 Drawing Figures

PATENTED OCT 15 1974  3,841,335
SHEET 1 OF 2
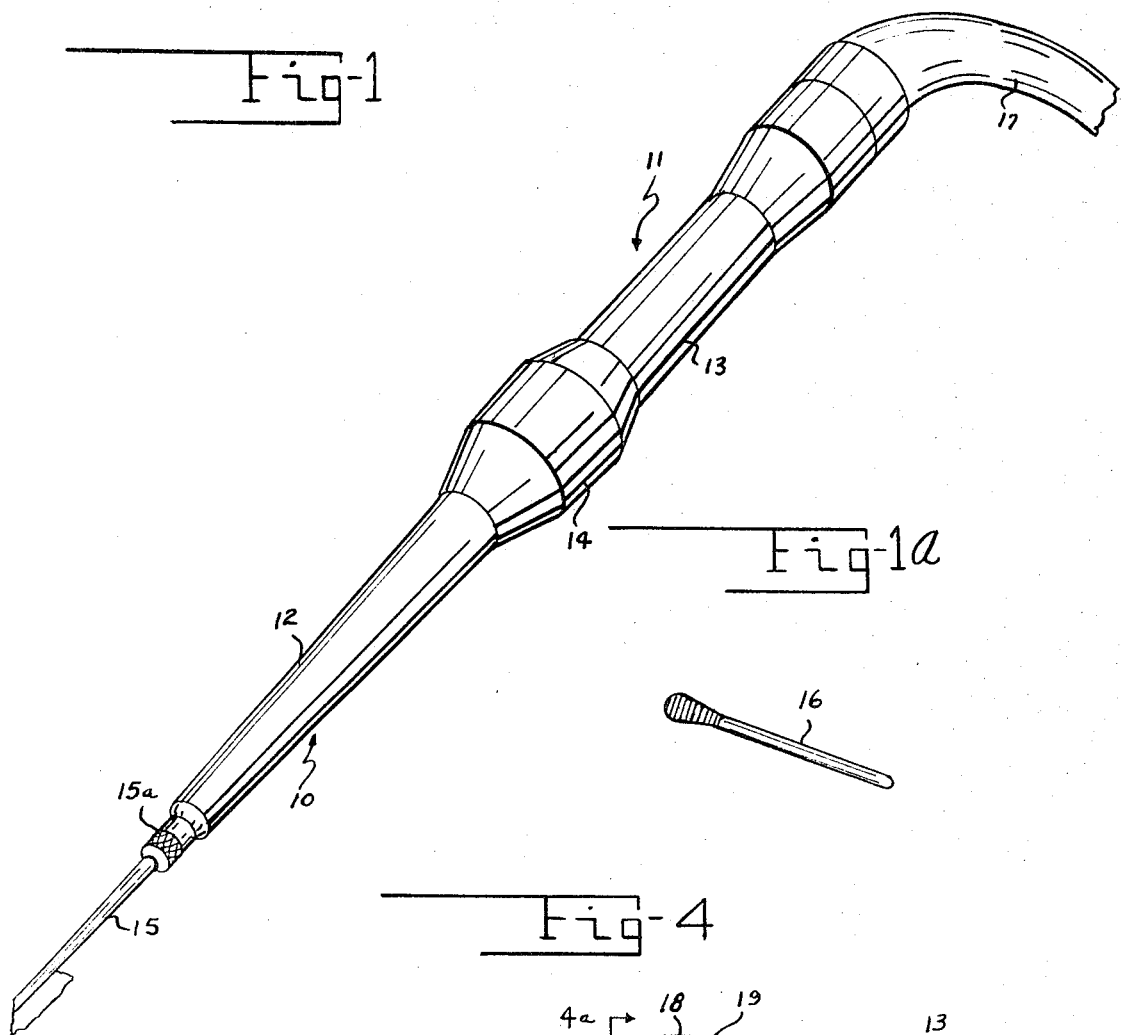
Fig-1
Fig-1a
Fig-4
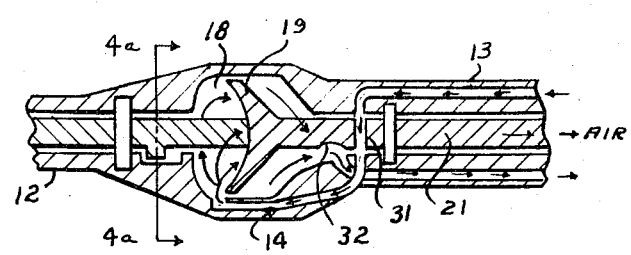
Fig-4a
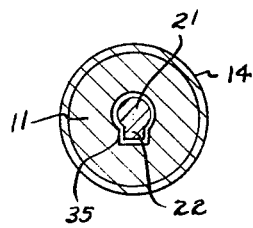
Fig-5
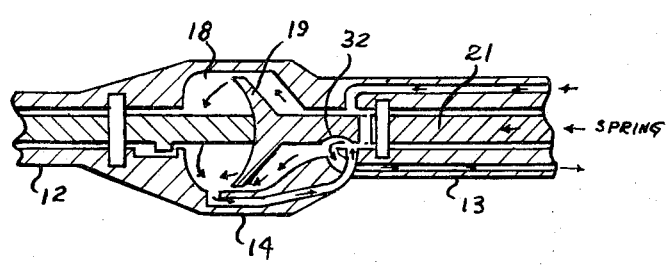

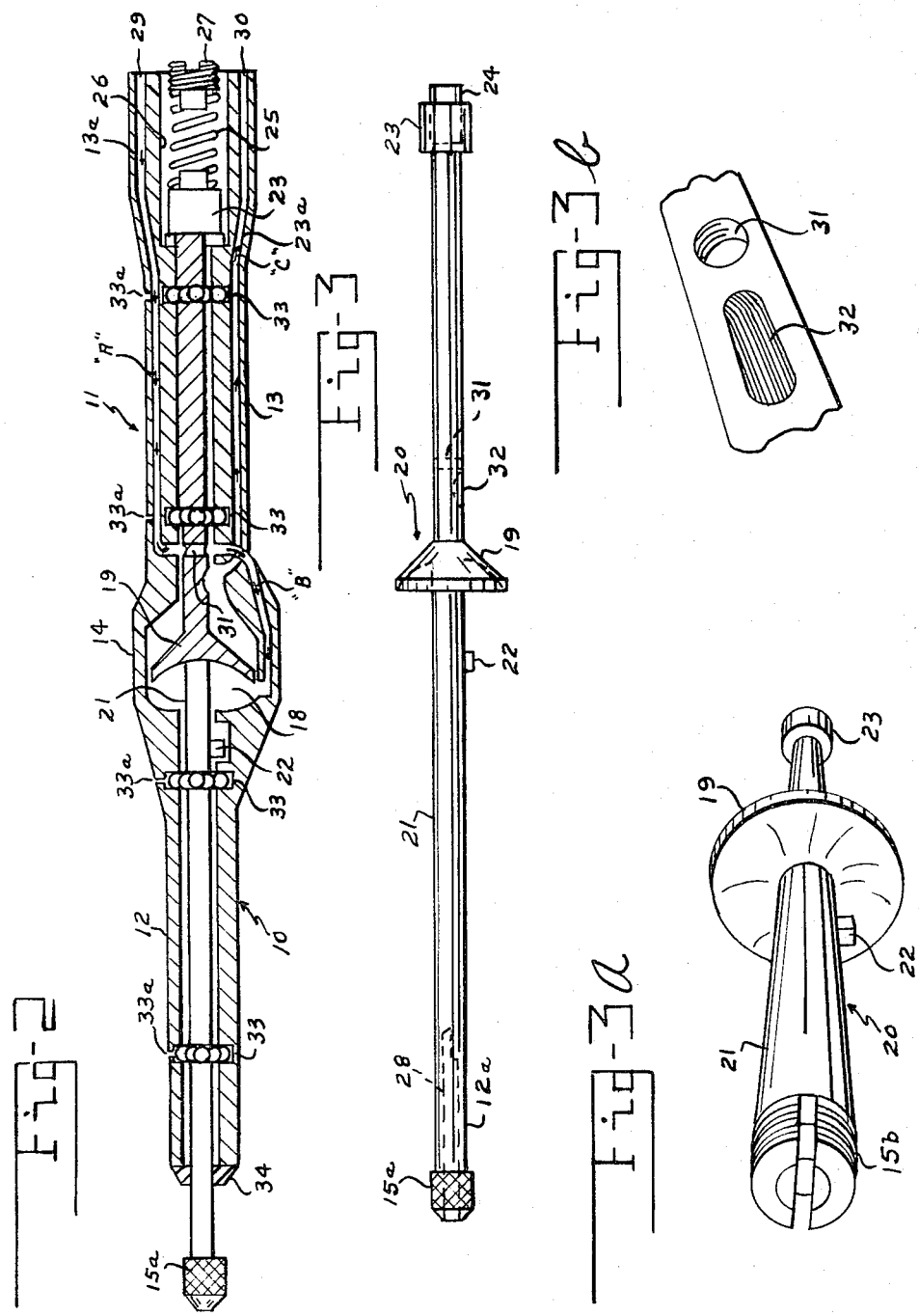

PNEUMATIC RECIPROCATING SURGICAL SAW AND FILE

BACKGROUND OF THE INVENTION

This invention relates generally to the field of surgical saws and files and, in particular, to a hand-held-type of surgical saw or file in which the cutting or filing strokes are effected entirely by reciprocatory motion but with the more complicated gear mechanisms of other arrangements having been eliminated.

In currently-used surgical saws and files, the power for the cutting or filing strokes thereof is accomplished by converting a rotary force from an air turbine or an electric motor, for example, into back-and-forth or, in other words, reciprocatory movements. Generally, the transfer of power is effected by means of gears and levers and, to this end, a gearbox is interposed between the rotary motion feeding into the device and the reciprocating motion at its working end. Such apparatus is obviously relatively complex, bulky and costly to manufacture. Moreover, a considerable amount of heat is generated during the operation thereof and, in addition, frequent maintenance and repair is required.

On the other hand, as will appear self-evident hereinafter in the following summary and detailed description, the new and improved reciprocating surgical saw and file of the present invention is unique in that it has been greatly simplified by the elimination both of the currently-used, rotary source of power and the aforementioned relatively complex gear and lever arrangement for converting rotary motion into reciprocating motion.

SUMMARY OF THE INVENTION

The present invention consists briefly in a novel surgical reciprocating saw and file device that has been combined into a single, unitary and relatively compact, hand-held assembly, and which uses a unique air escapement mechanism for converting power supplied by compressed air directly into reciprocating motion.

The aforementioned air escapement mechanism is incorporated within a main, elongated tubular, outer enclosure, casing or housing member and includes compressed air inlet and exhaust outlet passageways. In addition, an elongated piston rod member is slidably positioned within the central passage of the tubular, outer casing member and extends, at its front end portion, in overlapping relation out of the forward end of the tubular, outer casing member. The said rod member-front end portion incorporates a saw and/or file-receiving slot and both saw or file and slot are appropriately keyed in order to prevent any relative rotation therebetween. The aft or rear end portion of the rod member incorporates an enlarged spring-receiving element for engaging and retaining in position one end portion of a coil return spring, the other end of which being engaged and retained in position by an adjustment screw device.

A piston member, intermediately affixed to the aforementioned rod member, is positioned within a cylinder formed in the housing member, and compressed air admitted into aligned passageways, formed in both housing and rod members, is directed into the cylinder on one side of the piston member, where it acts upon the piston member to force both it and the rod member, together with the attached saw or file in one direction, constituting one stroke of the instant surgical saw or file, that is simultaneously operative to automatically compress the coil return spring. During this stroke, air trapped on the opposite side of the piston is exhausted through an air outlet passageway, and, on completion of this stroke, the air inlet passageways in the housing and rod members become completely disaligned to cut-off the incoming compressed air.

The compressed, return coil spring then automatically returns the piston and rod members in the opposite direction, forcing the air on one side of the piston over to the other side thereof and, again out of the air outlet passageways. At this time, the inlet air passageways are again aligned and the compressed air supply becomes automatically operative to begin the cycle over again and, in this manner, continues the reciprocation or back-and-forth movement of the piston and rod members, and, of course, the saw or file mounted in the forward end thereof, until the source of the compressed air is turned off.

Inherent objects and advantages of the present invention will appear hereinafter in the following disclosure, taken in connection with the accompanying drawings, in which:

BRIEF DESCRIPTION OF THE DRAWINGS

FIG. 1 is an overall assembled, and somewhat schematic and top perspective view of the hand-held, reciprocating saw and file device of the present invention with a saw member being shown assembled thereto;

FIG. 1a illustrates a surgical file member that would be utilizable with the inventive device of FIG. 1;

FIG. 2 is a longitudinal sectional and partly schematic view, depicting interior details of the saw and file device of FIG. 1;

FIG. 3 is a separate longitudinal view of a unique rod assembly forming an intergral part of the invention;

FIG. 3a is another, three-fourths view of the separate rod assembly of FIG. 3, depicting still further details thereof;

FIG. 3b is an enlarged fragmentary view of a portion of the rod assembly of FIGS. 2 and 3, showing a close-up of the inlet air passageway and air deflection groove formed in the said rod assembly;

FIG. 4 is another longitudinal sectional view, partly broken-away and schematic and illustrating details of the air powered stroke involved in the operation of a unique air escapement mechanism forming the key part of the present invention;

FIG. 4a is a cross-sectional view, taken about on line 4a—4a of FIG. 4 and more clearly depicting an alignment pin used on the inventive rod assembly; and FIG. 5 is still another longitudinal sectional view, partly broken-away and schematic and illustrating the spring powered return stroke of the new and novel air escapement mechanism of the invention.

DESCRIPTION OF THE PREFERRED EMBODIMENT

Referring generally to the drawings and, in particular, to FIG. 1 thereof, the overall assembly comprising the new and improved surgical reciprocating saw and file device of the present invention is indicated generally at 10 as including principally a main, elongated and tubular-type of casing, housing or enclosure member 11 having a forward end tubular portion 12, a rear or aft end tubular portion 13, and an enlarged central tubular portion 14. In the illustration of FIG. 1, a saw member, at 15, is depicted as being mounted to the said forward end tubular portion 12 and is held in locking position therewithin by means of a knurled locking nut, 15a, seen also in FIGS. 2 and 3. Of course, a file member, as at 16 in FIG. 1a, could be just as easily used, or, for that matter, any of a variety of surgical saws and/or files could be employed. To complete the description of the assembly of FIG. 1, a section of a main, common and flexible tube, as at 17, may be attached, as by means of a standard disconnect fitting, to the aft end portion of the inventive surgical saw or file device. Flexible tube 17 would preferably incorporate and house therewithin a compressed air inlet tube and an exhaust air outlet tube oriented in parallel relation to each other. Neither of these tubes have been specifically illustrated, since they would be of a common and readily available variety, with the specific details thereof being unimportant to the present invention. Suffice to say, that the compressed air inlet tube would deliver compressed air from a suitable source to a compressed air inlet formed in the aft end of the inventive device and to be further described hereinafter.

Referring particularly to FIG. 2, which depicts the interior of the casing, housing or enclosure member 11, it is clearly seen that the central tubular portion 14 has been enlarged to incorporate a cylinder 18 of a suitable size and configuration to specifically provide for the positioning therewithin of a slidably or reciprocatorily-movable, concaved-shaped piston, at 19. The latter member forms an integral part of a novel combined piston and rod assembly, indicated generally at 20 in FIG. 3, for example. The combined piston and rod assembly 20 includes, in addition to the piston 19, the elongated rod itself, indicated at the reference numeral 21, an alignment pin 22 extending downwardly in depending relation therefrom for a purpose to be further described, and an enlarged spring-abutment and receiving element 23 affixed to the rear or aft end of the rod 21 or, in other words, to the right-hand end thereof as viewed, for example, in FIG. 3. The element 23 is of a recessed configuration and incorporates a centrally-disposed and outward extending or projecting tongue element 24 that is designed to engage within and thereby capture or trap one end; namely, the left-hand end portion of a coil return spring, seen at 25 in the aforementioned FIG. 2. The other, or right-hand end portion of the coil return spring 25 abuts against and is similarly captured or trapped by a similar projecting tongue element formed on the inside surface of a spring adjustment screw 27. Within the front or forward end tubular portion 12 of the rod 21 is incorporated an elongated and keyed slot 28 within which is rigidly inserted a selected saw or file member as at 15 or 16. For this express purpose, the shanks of the selected saw or file member 15, 16 may naturally also be keyed to tightly interfit within the said keyed slot 28 and, in this manner, be prevented from rotating relative to the rod 21. In this connection, the rod 21 incorporates an externally threaded end portion, as is indicated at 15b in FIG. 3a, on which may be adjustably positioned the previously-mentioned knurled locking nut 15a of FIGS. 1, 2 and 3.

As is clearly visible in the previously-referred to FIG. 2, the aforementioned coil return spring 25 is positioned within a centrally-oriented recess or chamber 26 that is formed, in accordance with the unique teachings of the present invention, within the end section 13a of the rear or aft end portion 13 of the tubular casing, housing or enclosure member 11. The said end section 13a has been enlarged for the express purpose of accommodating not only the above-referred to chamber 26 for the coil return spring 25, but, in addition, to specifically provide for the compressed air inlet and passageways, the inlet thereof being indicated at 29 and the inlet passageways thereof being denoted by the arrows "A" and "B," and the exhaust air outlet and passageways respectively indicated at 30 and the arrows "C."

The key feature of the present invention involves the unique structure and operation of a novel air escapement mechanism that, as is illustrated in the aforementioned FIG. 2, and in FIGS. 4 and 5, comprises the previously-described piston and rod assembly 20, the coil return spring 25 and the compressed air inlet and exhaust outlet and passageways at 29 and "A" and "B," and at 30 and "C." Operation of the inventive device and, in particular, the novel air escapement mechanism is initiated by the introduction or admission of compressed air from a suitable source (not shown) through the common tube 17 (FIG. 1) into the previously-noted compressed air inlet 29 for passage through the compressed air inlet passageways generally indicated by the arrows at "A" and "B." At this time, the piston rod 21 and piston 19 would be in their "rest" or forward-most position of FIGS. 2 and 4, with the coil return spring 25 normally pressing the rod assembly 20 against a polytetrafluoroethylene stop at 23a (See FIG. 2), and an inlet air passageway that extends through the piston rod 21, as is more clearly indicated by the hole at 31 in FIG. 3b, would thereby be automatically placed in direct alignment, and therefore in open communication with and thus join or connect the compressed air inlet passageways "A" and "B" with each other. As is more clearly seen in the air powered stroke view of FIG. 4, the aforementioned alignment of the inlet air passageway 31 in the piston rod 21 would allow compressed air to enter the air inlet 29 (See FIG. 2) and immediately thereafter pass from the said air inlet 29 into the passageway "A," through the said air inlet passageway 31 in the rod 21, into the air inlet passageway "B" from whence it is automatically directed into the cylinder 18 to the left side of the piston 19. As the compressed air enters the cylinder 18, it acts upon the concaved surface of the piston 19, seen more clearly in FIG. 3a, of the rod assembly 20 and forces it and the assembly to the rear, or to the right against the coil return spring 25 which is thereby compressed. In addition, and simultaneously therewith, the air that was on the right side of the piston 19 is forced out through the exhaust air outlet passage "C" and outlet 30 where it would enter and be carried away from the inventive device by the previously-mentioned exhaust air tube (not shown) in the common tube 17 (FIG. 1). At this point, with the rod assembly 20 forced to the rear (right), the inlet air passageway 31 thereof would now no longer be lined up with the compressed air supply, thereby cutting off the incoming flow of compressed air.

With the above-described cut-off of the incoming compressed air and the simultaneous compression of the coil return spring 25 to the rear (right), the latter member now becomes effective to strongly push or return the rod assembly 20 including the piston 19 and rod 21 in the forward direction, or to the left as viewed in the depiction of the spring powered stroke of FIG. 5, for example. As seen particularly in the latter FIG. 5, simultaneous with the spring-return of the piston 19 and rod 21 to the left, air in the cylinder 18 on the left of the piston 19 is thereby forced to the right (rear) side of the said piston 19 and exhausted out through the air exhaust passageway "C" and outlet 30. The latter exhausting action of the air to the right of the piston 19 occurs and is made positive by the effect of a novel deflection groove 32, seen in clearer detail in FIG. 3b, which deflection groove 32 is oriented in position relative to the entrance opening of the outlet passageway "C" so as to specifically direct the air on the right side of the piston 19 directly into said exhaust passageway "C."

After having completed the above-noted spring powered stroke, the rod assembly 20 including piston 19 and rod 21 are, again, in the forward-most position to the left, at which time, the inlet air passageway 31 in the rod 21 is again aligned with the air inlet passageways "A" and "B" and the cycle is repeated over and over again to thereby provide new and improved reciprocatory or back-and-forth movement to the saw or file member, as at 15 or 16, that has been attached to the foward end of the rod 21. The unique reciprocation of the inventive surgical saw and/or file assembly of course continues until the main compressed air supply is exhausted or cut-off.

The previously-described surgical reciprocating saw and file device is unique for the reason that the rod assembly 20 comprising the piston 19 and rod 21 is the only moving part in the entire device. Moreover, the inventive rod assembly 20 is made of a hardened steel and may be supported by and reciprocated through a plurality of four (4) ball bearing ring members, indicated generally at 33 in FIG. 2, which ball bearing ring members 33 permit the rod 21 to oscillate back-and-forth in reciprocation only with great speed, while still running true. One drop of dental handpiece oil at each bearing oil point 33a will provide adequate lubrication. Also, it is noted that, for the sake of clarity, the exact means by which these ball bearing ring members 33, and also the piston rod assembly 20, may be assembled within the housing or enclosure member 11 is not shown, since the specific details thereof are unimportant to the new and improved air escapement mechanism forming the crux of the present invention. Obviously, the main, tubular casing, housing or enclosure member 11 could, during its manufacture, for example, be divided into four (4) matching sections joined, as by means of screw-threading at the locations of each of the said ball bearing ring members 33. With this arrangement, the enlarged central tubular portion 14 could also easily constitute a separate outer tube having its opposite sides formed with inside threaded portions for opposite engagement with outside threaded portions formed on the inward-facing ends of each of the forward and aft end tubular portions 12 and 13. Similarly, the rod assembly 20 could be appropriately divided into sections to be installed within the appropriate portions of the partially disassembled main, outer tubular casing, housing or enclosure member 11 during the manufacturing of the present device. Again, any of a number of different techniques could be used for the fabrication of the overall assembly of the present surgical reciprocating saw and file device without departing from the true spirit or scope of the invention.

Thus, a simple, sterilizable, small and hand-operated, reciprocating surgical saw and file device has been developed by the present invention for cutting, sectioning and filing of bone during surgical operations. Moreover, during such operations, a silicone seal 34 may be suitably bonded or otherwise inserted, as shown in FIG. 2, by any of a number of well-known means to or within the nose or extreme front end portion of the inventive surgical saw and file device. In this manner, the rod 21 is allowed to oscillate while blood and other fluids are prevented from entering and possibly fouling the front ball bearing ring member 33. Furthermore, the rod 21 is kept from rotating by means of the previously-noted alignment pin 22, formed in depending relation on the piston rod 21, which, as is seen more clearly in FIG. 4a, runs in a groove 35 formed in the outer casing, housing or enclosure member 11.

I claim:

1. A hand-held, reciprocating and pneumatically-operated, surgical instrument device for cutting, filing and sectioning of bone during surgical operations, comprising; a main, open-ended and elongated, enclosure member grippable by the human hand, and incorporating a plurality of bearing-supporting means, a relatively enlarged cylinder positioned in intermediate relation therewithin, and an elongated and axially-oriented passage having forward and rear passage portions extending in opposite and communicating relation from said cylinder to opposite open ends; a combined, elongated surgical instrument-supporting-and-operating rod member having a pneumatically responsive, relatively thin and substantially disc-like piston integrally formed in an upright relation thereon and further extending radially outward in all directions from the axis of said rod member, and disposed for adjustable reciprocatory movement in said cylinder and further dividing said rod member into a first, forwardly-oriented, rod member-portion extending in overlapping relation out of a front end opening of said cylinder and rigidly supporting a surgical instrument device on and as an extension of the frontmost end thereof, and a second, rearwardly-oriented, rod member-portion extending to a rearmost end rigidly supporting thereon a relatively enlarged, spring-abutment and receiving element, said rod member being supported for slidable and reciprocating movement only in said elongated and axially-oriented passage by said bearing-supporting means; a relatively enlarged, enclosure member-aft end portion having a flexible, outer tube releasably attached thereto and being common to, and adapted to house both compressed gas inlet and exhaust gas outlet tubes in parallel relation to each other; first, pneumatically-operated, gas escapement-power means including a first, relatively elongated, compressed gas inlet passage formed in said main enclosure member-aft end portion in open communication with the compressed gas inlet tube for receiving compressed gas therefrom at the rear end thereof and further extending in a forward direction in a substantially parallel relation to the elongated, axially-oriented passage to terminate in a relatively short and inwardly-turned, compressed gas-inlet passage portion and open end adjacent to said rod member; an opening extending through the diameter of said rod member comprising a second, relatively short, compressed gas inlet passage disposed with one end thereof in exact alignment and thus open communication with the relatively short and inwardly-turned compressed gas inlet passage portion of said first, relatively elongated, compressed gas inlet passage when said rod member and piston are in their forward stroke or rest position, and a third, relatively elongated, compressed gas inlet passage extending in open communication at one end thereof between said second, relatively short, compressed gas inlet passage formed in said rod member and the said cylinder forward of said piston to thereby provide a compressed gas flow automatically acting against the front side of said piston to drive it and the attached rod member and surgical instrument device in a rearward stroke-direction, and simultaneously therewith misaligning the previously opened communication between said first and second compressed gas inlet passages to cut off the flow of compressed gas into the cylinder and forcing the gas on the aft side of the piston out of the cylinder; a relatively elongated, exhaust gas outlet passage formed in said main enclosure member and the aft end portion thereof in substantially parallel relation to said first-named, compressed gas inlet passage, and in open communication between the exhaust gas outlet tube at the rear end thereof and the cylinder at the front end thereof to thereby automatically receive and exhaust the gas being forced out of the cylinder by the rearward stroke of said piston; and a second, resiliently-operated, gas escapement-power means comprising; a return spring positioned in a centrally-disposed chamber incorporated in said enclosure member-aft end portion, and being restrained between a screw adjustment means in the aft end wall of said enclosure member and the spring-abutment and receiving element on the aft end of the rod member, and further separating said first-named, compressed gas inlet passage from said exhaust gas outlet passage, and being automatically and initially compressed and thereby energized by the compressed gas-operated, rear stroke-movement of said rod member and piston to immediately thereafter force and return the now-compressed gas-freed, rod member, and attached piston and surgical instrument device in a forward stroke-direction to thereby force any air remaining in the cylinder on the forward side of the piston around said piston for its exhaustion through said exhaust gas outlet passage, the said rod member and attached piston and surgical instrument device being thereby continually reciprocated in the said rearward and forward-stroke direction until the main compressed gas supply being utilized is either exhausted or cut-off.

2. A hand-held, reciprocating and pneumatically-operated, surgical instrument device as in claim 1, wherein said piston is of a relatively enlarged configuration and incorporates a concaved front face for thereby ensuring the relatively intense concentration thereon of the force being produced by the impact thereagainst through the flow of compressed gas into the forward portion of said cylinder from said compressed gas inlet passages.

3. A hand-held, reciprocating and pneumatically-operated, surgical instrument device as in claim 1, wherein said elongated rod member incorporates a gas deflection groove of an arcuate-shaped configuration and positioned thereon somewhat aft of said piston and at a predetermined and aligned location relative to the exhaust gas outlet passage to thereby positively direct the gas being exhausted from the cylinder by the rearward and forward movement of said piston into the said exhaust gas outlet passage at the upstream end thereof in communication with said cylinder.

4. A hand-held, reciprocating and pneumatically-operated, surgical instrument device as in claim 1, wherein said spring-abutment and receiving element on the aft end of said rod member incorporates an aft end-facing, recessed portion and a rearwardly-projecting tongue member for respectively capturing and positively retaining therein the forward end of said return spring.

* * * * *